Feb. 23, 1965  L. D. NINNEMAN ETAL  3,170,971
METHOD FOR MAKING HOLLOW PLASTIC ARTICLES
Filed June 22, 1962
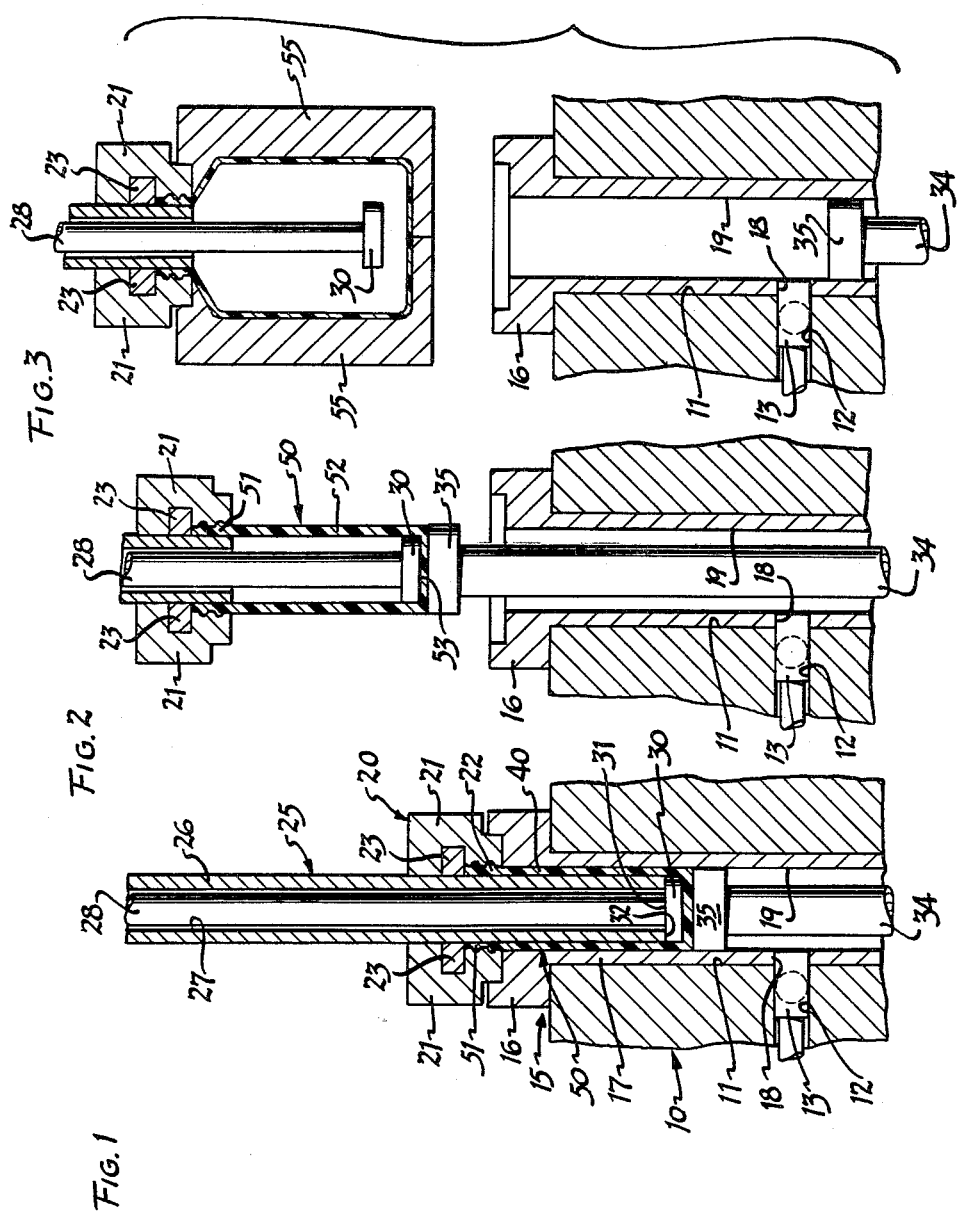
INVENTORS
LAWRENCE D. NINNEMAN
ANTHONY J. SCALORA
BY
ATTORNEYS

United States Patent Office 3,170,971
Patented Feb. 23, 1965

3,170,971
METHOD FOR MAKING HOLLOW PLASTIC ARTICLES
Lawrence D. Ninneman and Anthony J. Scalora, Toledo, Ohio, assignors to Owens-Illinois Glass Company, a corporation of Ohio
Filed June 22, 1962, Ser. No. 204,526
7 Claims. (Cl. 264—97)

The present invention relates to a method of forming hollow plastic articles and, more particularly, to a method of making hollow plastic articles, such as blown plastic containers, from a preform or parison injection molded at low pressures and free of thermally induced structural weaknesses and stress concentrations.

In the earlier filed, copending application of Thomas R. Santelli, Serial No. 146,686, filed October 17, 1961, now abandoned, and assigned to the assignee of the present invention, there is disclosed a plastic article which is blow molded from an injection molded preform and which is free of those thermally induced structural weaknesses and stress concentrations normally inherent in articles blown from injection molded preforms by the conventional processes utilizing the injection of plastic material at high pressures through reduced orifices. The many advantages of low pressure injection molding processes are well set forth in the Santelli application, which is assigned to the assignee of the present invention.

The present invention proposes a specific, novel method of making such blown articles and utilizing the low injection molding pressure technique heretofore described in said Santelli application. More specifically, the present invention proposes the initial injection molding of a substantially cylindrical blowable preform portion within a substantially cylindrical mold space fully communicating with a separable neck or finish mold. The blowable portion of the preform is defined, during molding, about a retractable central sleeve axially aligned with the injection molding piston. After the molding operation, the sleeve is retracted and the preform is stripped from the cylindrical space within which it is molded by utilization of the injection molding piston. The stripped parison or preform is finally inflated interiorly of a blow mold to its final configuration.

In addition to all of the advantages of low pressure injection molding, the instant process and apparatus possesses several other advantages. For example, the blowing or inflating of the container body or like portion of the article has no effect upon the injection molded finish of the article which is fully supported, both internally and externally, throughout the entire injection molding and blow molding operations, and utilization of the injection ram in the stripping operation further simplifies the apparatus and process by permitting utilization of fixed or unitary injection molds while fully supporting the parison throughout the entire stripping operation.

It is, therefore, an important object of the present invention to provide a new and improved method of injection molding a parison from which a blown plastic article is formed.

Another important object of the present invention is the provision of a novel process for manufacturing a blown plastic container or the like from a parison which is injection molded in a unitary cylindrical mold cavity surmounted by a finish mold within which the container finish is simultaneously injection molded and continuously confining the injection molded finish during stripping of the subsequently blown parison portions from the parison mold and while blow molding these portions of the parison.

It is still another important object of this invention to provide an improved blow molding process whereby a subsequently blown parison, injection molded in a mold cavity under pressure exerted by an injection ram, is subsequently stripped from the injection cavity by utilization of the ram to support the parison during stripping.

Yet another, and no less important, object of the present invention is the provision of an apparatus usable in the present process for making a blow molded parison including a cylindrical feed sleeve to which plasticized material is supplied to be compacted by an injection ram, the feed sleeve forming the exterior surface of an injection cavity and receiving therein a concentric sleeve defining the inner member of the injection cavity, the inner sleeve projecting through a finish mold communicating fully with the cavity and movable relative thereto for transferring the resultant parison to a remote blowing station.

Other objects of this invention will appear in the following description and appended claims, reference being had to the accompanying drawings forming a part of this specification wherein like reference characters designate corresponding parts in the several views.

On the drawings:

FIGURE 1 is a vertical sectional view of an apparatus capable of carrying out the method of the present invention;

FIGURE 2 is a view similar to FIGURE 1 but illustrating the parison stripped from the parison molding cavity;

FIGURE 3 is a view similar to FIGURE 2 but illustrating the stripped parison inflated within a segmental blow mold.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to a massive feed block provided with one or more vertical bores 11 communicating freely with a lateral feed bore 12. The lateral feed bore 12 communicates with a source of plasticized plastic material advanced through the bore by suitable means, as by a feed piston 13. A suitable mechanism for supplying plasticized material to the bore 12 is illustrated in the above defined application of Thomas R. Santelli, Serial No. 146,686.

Positioned within the bore 11 is a feed sleeve indicated generally at 15. This feed sleeve 15 is provided with an upper peripherally enlarged embossment 16 seated upon the upper surface of the block 10 and concentric with a depending cylindrical sleeve portion 17 projecting into the bore 11 and having an aperture 18 registering with the feed bore 12. The inner periphery 19 of the sleeve 17 is truly cylindrical in contour.

Superimposed over the sleeve 15 is a neck or finish mold 20 comprising laterally separable neck mold segments 21 which cooperatively define at their lower ends a generally cylindrical recess 22 having its exterior surface appropriately contoured to define the exterior surface of a neck or finish portion of a container. Carried by the neck mold segments 21 are insert blocks 23, the undersurfaces of which define the upper extremity of the recess 22.

Projecting through the neck mold 20 is a parison sleeve 25, this parison sleeve being truly cylindrical in configuration and being concentric with the bore 19 of the feed sleeve 15. This parison sleeve 25 is provided with a cylindrical exterior surface 26 and with an interior bore 27 through which projects an actuating rod 28 bearing at its lower end a generally cylindrical valve head 30. This valve head 30 is of a diameter substantially equal to the exterior diameter of the parison sleeve 25, and the upper surface 31 of the valve head 30 snugly abuts the open end 32 of the parison sleeve 25 to form an airtight joint therebetween. As explained in detail in the above-identified Santelli application, the sleeve 26 and the actuating rod 28 are independently axially displaceable relative to one another and relative to the neck mold 20.

It will be noted that the parison sleeve 25 depends downwardly into the bore 19 of the feed sleeve 15. Projecting upwardly and axially into the other end of the feed sleeve is an injection ram 34 having an enlarged head 35 snugly fitting into the bore 19 of the feed sleeve 15.

The operation of the apparatus shown in the drawings is such that the feed piston 13 injects plasticized material into the bore 19 of the feed sleeve 15 when the ram head 35 is retracted beneath the level of the sleeve feed aperture 18. At this time, the neck mold 20 is positioned as illustrated in FIGURE 1 in snug abutment with the free upper extremity of the feed sleeve embossment 16. Further, at this time the parison sleeve 25 is positioned as illustrated in FIGURE 1 of the drawings, i.e. the free end 32 of the parison sleeve 25 snugly abuts the upper surface 31 of the valve head 30.

Next, the ram head 35 is advanced vertically to its position illustrated in FIGURE 1 displacing the plasticized material into the cylindrical mold cavity or space 40 defined between the exterior periphery 26 of the parison sleeve 25 and the interior periphery 19 of the feed sleeve 15. This mold space 40 communicates freely at its upper end with the neck mold space 22. As a result, the generally cylindrical parison 50 is formed, this parison including an upper injection molded finish portion 51 filling the neck mold space 22, a generally cylindrical portion 52 concentrically surrounding the parison sleeve 25 and a lower closed end 53 interposed between the valve head 30 and the ram head 35.

Next, the parison sleeve 25 is retracted upwardly away from the valve head 30 while the valve head 30, the ram head 35, and the neck mold 20 remain in their positions illustrated in FIGURE 1. Next, the neck mold 20 is retracted vertically upwardly from its position of FIGURE 2 to its position of FIGURE 1, while the valve head 30 and the valve stem 28 are simultaneously retracted to remain in their same relative positions with respect to the neck mold. Concurrently, the injection ram head 35 is similarly elevated to maintain its position relative to the moving neck mold 20.

Such elevation of the neck mold, the valve head and the injection ram head will, of course, elevate the parison 50 carried thereby and the parison will, accordingly, be stripped from the bore 19 of the feed sleeve 15. The previous retraction of the parison sleeve 25 will leave the interior of the cylindrical parison side wall 52 unsupported. At the same time, the plasticized material constituting the parison will be cooling and thermally shrinking from contact with the sleeve 15. As a result, the cylindrical wall 52 of the parison will shrink thermally in a radial inward direction, thus promoting stripping of the parison from the sleeve 15. Further, the vertical displacement of the ram head 35 will further aid such stripping while at the same time insuring complete support of the bottom 53 of the parison 50 during removal of the parison from the sleeve.

Thus, as illustrated in FIGURE 2 of the drawings, the injection molded neck 51 of the parison will remain fully supported at its exterior by the neck mold sections 22 and at its interior by the lower end of the parison sleeve 25, and the lower extremity or wall 53 of the parison will be confined between and supported by the valve head 30 and the ram head 35. The parison is thus stabilized during stripping while the aforementioned radial inward thermal shrinkage of the side walls 52 is accommodated.

Finally, the injection ram head 35 is retracted vertically downwardly to its position of FIGURE 3 beneath the level of the feed port 18, the parison 50 is enclosed within a blow mold defined by blow mold sections 55, and air under pressure is introduced into the interior of the parison 50, such air passing between the inner periphery 27 of the parison sleeve 25 and the exterior periphery of the valve rod 28. During inflation of the parison 50, the finish or neck portions 51 thereof will not be affected, since these portions remain confined between the neck mold sections 21 and the lower end of the parison sleeve 25, while the cylindrical side walls 52 of the parison will be inflated outwardly against the interior chill walls of the blow mold sections 55. Finally, the parison bottom wall 53 will be stripped from the undersurface and the side surfaces of the valve head 30, as the parison is inflated outwardly in all directions.

From the foregoing description, it will be readily appreciated that the present invention provides an extremely simple method for manufacturing blown plastic articles, such as containers or the like.

First, all of the advantages of low pressure injection formation of a blowable parison disclosed and discussed in the above-identified Santelli application are obtained by following the teachings of the present invention.

Secondly, the specific technique herein disclosed for stripping the parison from the parison injection mold makes possible the utilization of a very simple feed sleeve 15 instead of more conventional split parison molds which are opened relatively to remove the parison.

Additionally, utilization of the injection head 35 to strip the parison from the feed sleeve insures full and complete support for the parison bottom during the stripping operation and insures complete and clean stripping of the parison.

Further, utilization of the cylindrical parison sleeve 25 insures full and complete support of the neck or finish portion 51 of the parison during parison injection, parison stripping, and parison inflation.

We claim:

1. In a method of making a blown plastic article from a parison defining a closed blowable shape and having an injection molded finish portion, the steps of injection molding both the parison finish portion and the closed parison blowable portion about a cylindrical sleeve, axially retracting the cylindrical sleeve from the parison blowable portion prior to blowing of the parison, and continuing to support the parison injection molded finish portion by the sleeve during blowing of the blowable portion of the parison.

2. In a method of making a blown plastic article from an injection molded parison having a closed end and defining a complete blowable shape, the steps of introducing plasticized material into a cylindrical feed sleeve having an injection mold at one end thereof and a concentric parison sleeve projecting through said mold axially into said feed sleeve, advancing the plasticized material into said mold by an injection ram movable in said feed sleeve into spaced relation to said parison sleeve, maintaining an injection molding pressure upon said material by said injection ram to form the parison, the closed parison end being formed between said ram and said parison sleeve, and stripping the molded material from the sleeve by concurrent movement of the injection ram and the mold.

3. In a method of making a blown plastic container by the inflation of a parison, the steps of positioning a neck mold in communication with a generally cylindrical parison mold space in which an injection piston is axially displaceable, positioning in said mold space a parison element concentric therewith to define with said neck mold a composite injection mold conforming to the shape and size of said parison, displacing the injection piston to fill said mold space and said neck mold with plasticized material, axially withdrawing the parison element from the interior of the resultant injection molded parison, and then jointly displacing said neck mold and said injection piston to strip the parison from said mold space without affecting the size and shape of said parison.

4. In a method of making a blown plastic container having an injection molded finish and a blown body, the steps of positioning a cylindrical sleeve interiorly of a unitary cylindrical mold, the sleeve projecting through a separable finish mold and having a closed end spaced from the corresponding end of the cylindrical mold, injecting plasticized material into the space between the mold and the sleeve and into the finish mold to form a parison having integral finish and blowable portions, said blowable portion having a closed end portion located at the end of said sleeve, axially retracting the cylindrical sleeve from the parison blowable portion while retaining a portion of the sleeve internally of the finish portion prior to blowing of the parison, and continuing to support the parison finish portion by the sleeve during blowing of the parison blowable portion.

5. In a method of making a blown plastic article by the inflation of an injection molded parison, the steps of forming the parison to a final blowable shape and size in a mold from plasticized material subjected to an injection molding pressure by an injection ram movable relative to the mold, and stripping the resultant parison from the mold by further movement of the injection ram and without affecting the shape and size of the parison.

6. In a method of making a blown container having an injection molded finish and a blown body, the steps of injection molding a closed-end parison about a single cylindrical sleeve having a closed end and defining the interior of both the finish portion and the blowable portion of the parison, axially retracting the cylindrical sleeve from the parison blowable portion to space the closed end of the sleeve from the closed end of the parison prior to blowing of the parison and continuing to support the parison finish portion by the sleeve during blowing of the container body.

7. In a method of making a blown plastic container by inflating a closed-end parison, the steps of superimposing a neck mold over a generally cylindrical parison mold space in which an injection piston is axially displaceable, positioning in said mold space a parison sleeve concentric therewith and having a freely dependent lower end closed by a valve element movable relative to the sleeve, displacing the injection piston to fill said mold space and said neck mold with plasticized material, the closed end of the parison being defined between the closed lower end of said sleeve and said injection piston, axially withdrawing the sleeve only from the interior of the resultant injection molded parison while continuously supporting the material in said neck mold by said sleeve, continuously supporting the parison at one end by said neck mold and at the other end by said valve element and said piston while jointly displacing said neck mold, said valve element and said injection piston to strip the parison from said mold space, retracting said piston, and inflating the parison.

References Cited in the file of this patent

UNITED STATES PATENTS 2,804,654 Sherman _____ Sept. 3, 1957

FOREIGN PATENTS 758,299 Great Britain _____ Oct. 3, 1956